(12) United States Patent
Nedeltchev et al.

(10) Patent No.: US 7,748,035 B2
(45) Date of Patent: Jun. 29, 2010

(54) APPROACH FOR SECURELY DEPLOYING NETWORK DEVICES

(75) Inventors: Plamen Nedeltchev, Santa Clara, CA (US); Max Pritikin, Santa Cruz, CA (US); Gautam Aggarwal, San Jose, CA (US); Pedro J. Leonardo, San Francisco, CA (US); David Iacobacci, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1110 days.

(21) Appl. No.: 11/112,948

(22) Filed: Apr. 22, 2005

(65) Prior Publication Data

US 2006/0242695 A1 Oct. 26, 2006

(51) Int. Cl.
*G06F 9/00* (2006.01)
*G06F 15/177* (2006.01)

(52) U.S. Cl. .................... 726/15; 726/27; 713/2
(58) Field of Classification Search ................ 718/104; 709/220, 230; 726/15, 27; 370/389; 713/2
See application file for complete search history.

(56) References Cited

U.S. PATENT DOCUMENTS

| | | | |
|---|---|---|---|
| 6,836,888 B1 * | 12/2004 | Basu et al. ............... | 718/104 |
| 7,167,920 B2 * | 1/2007 | Traversat et al. .......... | 709/230 |
| 7,181,620 B1 * | 2/2007 | Hur ........................... | 713/171 |
| 7,313,819 B2 * | 12/2007 | Burnett et al. .............. | 726/15 |
| 2004/0064351 A1 | 4/2004 | Mikurak | |
| 2005/0198218 A1 * | 9/2005 | Tasker et al. .............. | 709/220 |
| 2006/0198368 A1 * | 9/2006 | Guichard et al. ........... | 370/389 |
| 2006/0212937 A1 * | 9/2006 | Natarajan .................. | 726/15 |

OTHER PUBLICATIONS

Manuel Román,A Middleware Infrastructure to Enable Active Spaces; Year 2002; IEEE; pp. 1-14.*
Rao, Sathya, "Review of Status of Early Relevant Standards", Information Society Technologies, IST-2000-25153 Deliverable D4, European Commission on IPv6 Wireless Internet IniTiative (WINIT), Jan. 2002, 26 pages.
International Searching Authority, "Notification of Transmittal of the International Search Report and the Written Opinion of the International Searching Authority, or the Declaration", International application No. PCT/US06/11386, 8 pages.
Claims, International application No. PCT/US06/11386, 6 pages.

* cited by examiner

*Primary Examiner*—Kambiz Zand
*Assistant Examiner*—William S Powers
(74) *Attorney, Agent, or Firm*—Hickman Palermo Truong & Becker LLP

(57) ABSTRACT

According to an approach for securely deploying and configuring network devices, a secure introduction connection is established between a network device being deployed and a registrar. The secure introduction connection may conform to a secure communications protocol, such as HTTPS. The registrar provides bootstrap configuration data to the network device over the secure introduction connection. The bootstrap configuration data is used to establish a secure management connection between the network device and a secure management gateway. The secure management connection may conform to a secure communications protocol, such as IPsec or HTTPS. The secure management gateway provides user-specific configuration data and security policy data to the network device over the secure management connection. The user-specific configuration data and policy data are used to establish a secure data connection, such as a Dynamic Multipoint Virtual Private Network (DMVPN) connection, between the network device and the secure data gateway.

36 Claims, 3 Drawing Sheets

APPROACH FOR SECURELY DEPLOYING NETWORK DEVICES

FIELD OF THE INVENTION

This invention relates generally to networking, and more specifically, to an approach for securely deploying a network device.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

One of the issues with deploying network devices is that although physically installing network devices may be relatively straightforward, the installed network devices must then be configured, which can be difficult and require a high level of user knowledge and involvement. For example, configuring a router with secure network connections, such as Virtual Private Networks (VPNs), can be tedious and difficult to troubleshoot for end users who are not experienced in such tasks. In corporate environments, it is not uncommon for deployment specialists to manually configure network devices before they are installed at their destinations. Although this reduces the burden on end users, it does not address all of the issues. In some situations, a large number of network devices need to be deployed as quickly and inexpensively as possible. This is difficult to do using conventional approaches because of the human resources that are required to manually configure a large number of network devices. Mistakes can also be made during the manual configuration process, which can require reconfiguring some network devices. Furthermore, corporate policies that drive the configuration of network devices are often not static and can change unexpectedly. Thus, last minute changes in corporate policies can also require reconfiguring network devices that have already been configured according to a prior corporate policy, which adds to the cost and can cause delays in deployment.

Based on the foregoing, there is a need for an approach for deploying network devices that does not suffer from limitations of prior approaches.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE
III. SECURE DEPLOYMENT
IV. UPDATING NETWORK DEVICE CONFIGURATION
V. IMPLEMENTATION MECHANISMS

I. Overview

An approach is provided for securely deploying and configuring network devices. A secure introduction connection is established between a network device being deployed and a registrar. The secure introduction connection may conform to a secure communications protocol, such as HTTPS. The registrar provides bootstrap configuration data to the network device over the secure introduction connection. The bootstrap configuration data is used to establish a secure management connection between the network device and a secure management gateway. The secure management connection may conform to a secure communications protocol, such as IPsec or HTTPS. The secure management gateway provides user-specific configuration data and security policy data to the network device over the secure management connection. The user-specific configuration data and policy data are used to establish a secure data connection between the network device and the secure data gateway. The secure data connection may be a Dynamic Multipoint Virtual Private Network (DMVPN) connection that allows data, such as voice data, to be securely exchanged between the network device and the secure data gateway. The approach provides for secure deployment of a network device, for example a router, without a user having to be aware of any details of how the network device is configured. Furthermore, the use of a secure management connection allows security policies to be implemented in a controlled and secure manner.

II. Architecture

Figure 1:
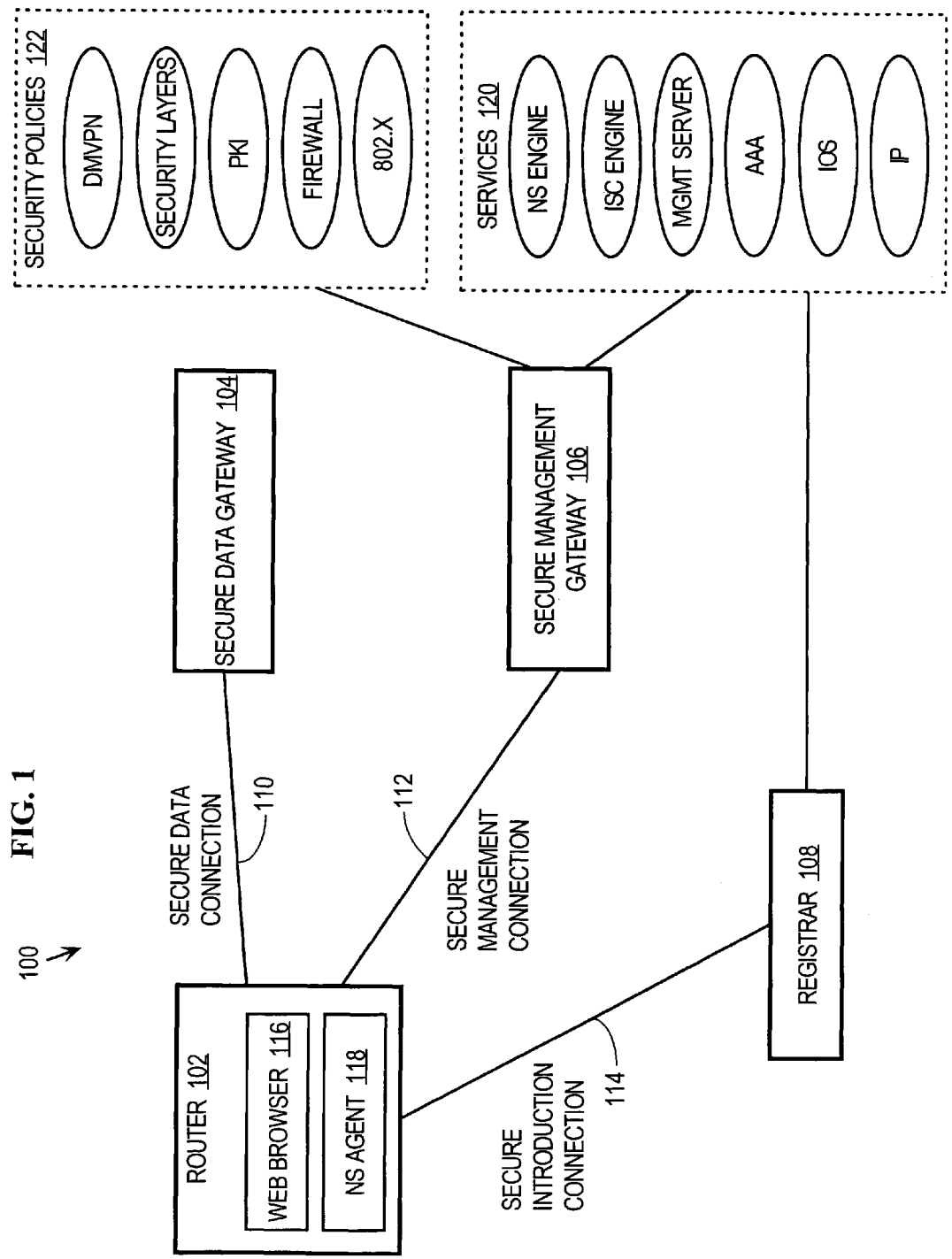
FIG. 1 is a block diagram that depicts an arrangement for securely deploying a network device, according to an embodiment of the invention.

FIG. 1 is a block diagram that depicts an arrangement 100 for securely deploying a network device, according to an embodiment of the invention. Arrangement 100 includes a router 102, a secure data gateway 104, a secure management gateway 106 and a registrar 108. Router 102 is communicatively coupled to secure data gateway 104, secure management gateway 106 and registrar 108 via communications links 110, 112 and 114, respectively. Communications links 110, 112, 114 may be implemented by any mechanism or medium that provides for the exchange of data between router 102 and secure data gateway 104, secure management gateway 106 and registrar 108. Examples include, without limitation, a network such as a Local Area Network (LAN), Wide Area Network (WAN), Ethernet or the Internet, or one or more terrestrial, satellite or wireless links. Other communications links and methods may be provided between the elements depicted in FIG. 1, depending upon a particular implementation. For purposes of explanation, embodiments of the invention are described hereinafter in the context of deploying a single router 102. The approach is not limited to this context however, and is applicable to deploying any type and number of network devices.

Router 102 is configured with a generic Web browser 116 and a network services (NS) agent 118, for example, a Cisco NS agent (CNS). Secure data gateway 104 may be implemented, for example, as a corporate router that provides access to various data services, such as voice communications services. Secure management gateway 106 may be implemented by any mechanism or process, for example a management router, which controls access to services 120 and security policies 122. Services 120 include an NS engine, such as a Cisco NS (CNS), a configuration and policy engine, such as the Cisco IP Solutions Center (ISC) engine, a management (MGMT) server, Authentication, Authorization and Accounting (AAA) services, Internetworking Operating System (IOS), such as Cisco IOS and IP services, such as Quality of Service (QOS), Network Time Protocol (NTP) services and Network Address Translation (NAT) services. Security Policies 122 DMVPN, security layers, Public Key Infrastructure (PKI), firewalls or communications protocols, such as 802.X. The particular services 120 and security policies 122 depicted in FIG. 1 are provided as examples. The invention is not limited to these particular example services and security policies, however, and others may be used, depending upon a particular implementation. Registrar 108 is a mechanism or process that is configured to establish a secure introduction connection with router 102 and provide a bootstrap configuration to router 102 to allow communications between router 102 and both secure management gateway 106 and secure data gateway 104. Registrar also has access to services 120 and security policies 122. The operation of the various components depicted in FIG. 1 is described in more detail hereinafter.

III. Secure Deployment

Figure 2:
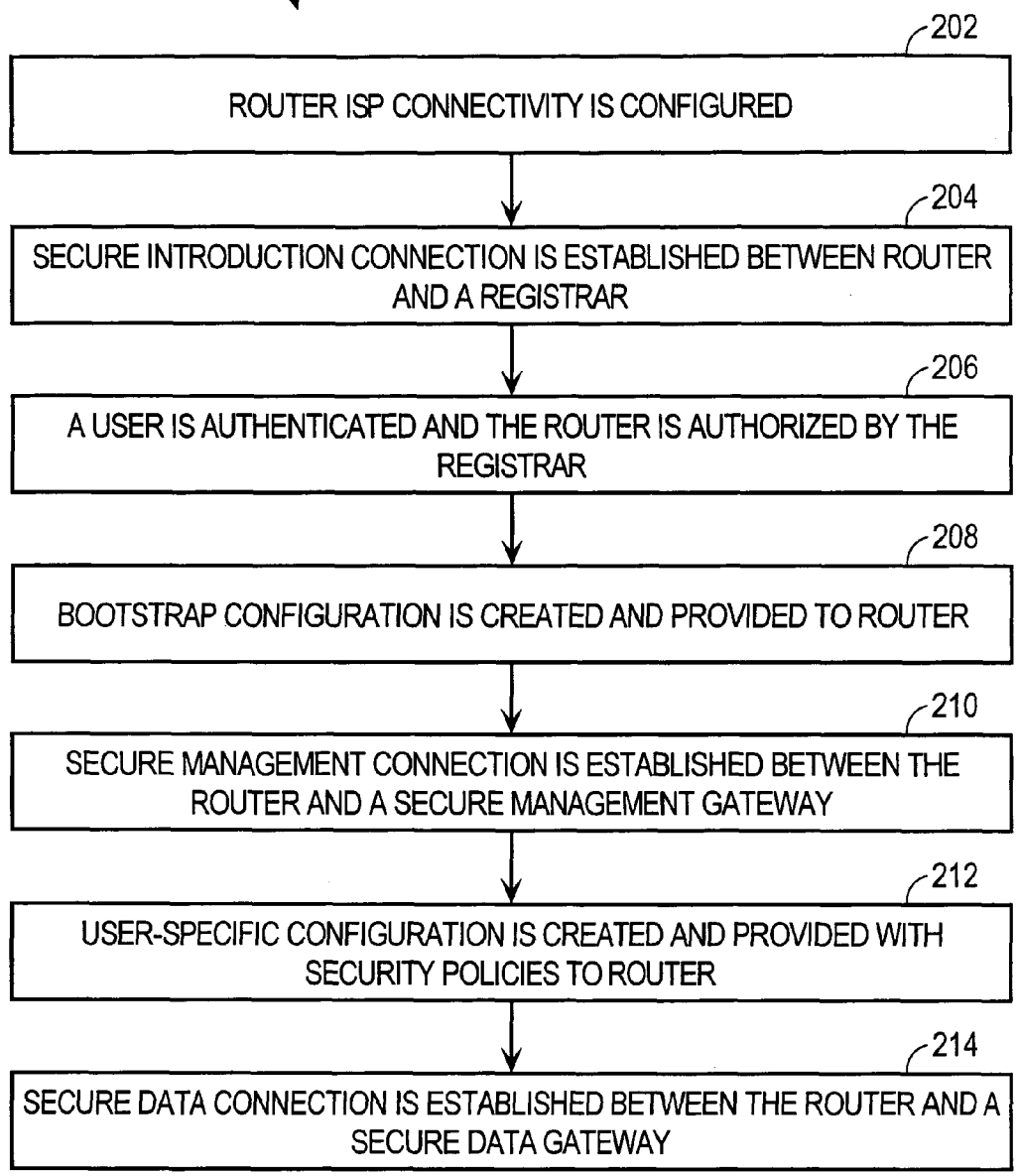
FIG. 2 is a flow diagram that depicts an approach for securely deploying a router, according to an embodiment of the invention.

The approach for securely deploying a network device is now described with reference to FIG. 2 in the context of deploying router 102. It is presumed before the process beings that router 102 has been ordered and properly installed. In step 202, router 102 is configured with Internet Service Provider (ISP) connectivity.

In step 204, a secure introduction connection is established between router 102 and registrar 108. A variety of techniques may be used to establish the secure introduction connection between router 102 and registrar 108, depending upon the requirements of a particular implementation. For example, approaches that use a so called "out of band" approaches may be used to exchange key material. Approaches that require less user interaction may also be used. An approach that uses a trusted intermediary is described in co-pending U.S. patent application Ser. No. 10/411,964, filed on Apr. 10, 2003 and entitled "Method And Apparatus For Securely Exchanging Cryptographic Identities Through A Mutually Trusted Intermediary," the entire contents of which are hereby incorporated by reference in their entirety for all purposes.

According to one embodiment of the invention, a user enters a URL of registrar 108 into Web browser 116 and Web browser 116 issues a Simple Certificate Enrollment Protocol (SCEP) request to registrar 108. Registrar 108 replies with a request for user authentication. According to one embodiment of the invention, registrar 108 supplies a Web page to router 102 that queries the user for a username and password. The user enters a username and password that are sent to registrar 108 by Web browser 116.

In step 206, a user of router 102 is authenticated and router 102 is authorized by registrar 108. For example, registrar 108 may access AAA services 120 to authenticate the user based upon the username and password provided by the user.

In step 208, bootstrap configuration data is created and provided to router 102. According to one embodiment of the invention, registrar 108 issues a Common Gateway Interface (CGI) request to a Java servlet executing on a management server in services 120. The Java servlet generates the bootstrap configuration data that is specific to router 102 based upon the CGI request and instantiates one or more variables contained in the bootstrap configuration data. For example, the Java servlet may instantiate the hostname of router 102 in accordance with corporate policy conventions, as well as a subnet and management IP address for router 102. The Java servlet provides the bootstrap configuration data to a registrar 108. Registrar 108 may also instantiate one or more variables contained in the bootstrap configuration data. For example, registrar 108 may instantiate the size of keys, a trustpoint label and a crypto Web User Interface (WUI) engine label. Registrar 108 then provides the bootstrap configuration data to router 102 over the secure introduction connection.

In step 210, a secure management connection is established between router 102 and secure management gateway 106 based upon the bootstrap configuration data. The secure management connection may conform to a secure communications protocol, such as IPsec or HTTPS. Either encryption mode, transport or tunneling, may be used with IPsec. The secure management connection provides functionality that is conventionally not supported by the secure introduction connection between router 102 and registrar 108. For example, the secure management connection allows security policies 122 to be pushed to router 102 in a controlled and secure manner. According to one embodiment of the invention, NS agent 118 is activated on router 102 and causes a "connect" event to indicate that the secure management connection 112 has been established. The "connect" event is processed by the NS engine service in services 120.

In step 212, user-specific configuration data is created and provided with security policies from secure management gateway 106 to router 102 over the secure management connection. The user-specific configuration data and security policies include data needed by router 102 to establish the secure data connection to the secure data gateway 104. For example, this may include information about tunneling, encapsulation, security layers, PKI, firewalls or communications protocols, such as 802.X.

In step 214, a secure data connection is established between router 102 and secure data gateway 104 based upon the user-specific configuration data and the security policies. The secure data connection allows data to be securely exchanged between router 102 and secure data gateway 104. According to one embodiment of the invention, the secure data connection is a DMVPN connection. In this situation, the user-specific configuration data and security policies provided to router 102 over the secure management connection include information that allows router 102 to establish the DMVPN connection with secure data gateway 104. In the context of the secure data connection being a DMVPN connection, secure management gateway 106 is the management hub and secure data gateway 104 is a data hub.

IV. Updating Network Device Configuration

The approach described herein for securely deploying network devices also allows the configuration of deployed network devices to be dynamically updated over time. The use of a separate secure management connection and a secure data connection allows changes to be made to the configuration of a network device using the secure management connection without disturbing the secure data connection. For example, suppose that router 102 has been deployed as described herein. Suppose further that a change has been made to one or more security policies 122 to change the current encryption. The ISC engine service may push the updated policies to router 102 via the secure management connection without having to disturb the secure data connection. If router 102 is not available at the time the ISC engine service attempts to push the updated policies to router 102, then the ISC engine service may push the updated policies to router 102 at another time, for example by rescheduling.

The use of separate secure management and secure data connections also allows central management of multiple network devices. For example, secure management gateway 106 may be a central management center that has secure management connections to multiple network devices. In this example, the central management center can remotely manage any number of network devices that are located in close proximity to users. The secure management connection can also provide a separate and secure manner to enter customer premises, with minimal intrusion on the customers.

The determination of when a network device's configuration is updated may be made based upon a variety of factors. For example, the NS engine service may schedule the configuration update of router 102. The update may also be performed in response to an event caused by NS agent 118 on router 102. For example, NS agent 118 may trigger an update request event that is processed by the NS engine service.

V. Implementation Mechanisms

The approach described herein for securely deploying network devices provides the benefit that a user does not need to be aware of any details of configuring a network device, such as particular configuration parameters or policies. Also, a user does not need to schedule the configuration of a network device, because the approach allows this to be done automatically by services 120. The use of separate secure management and secure data connections provides great flexibility in managing any number of network devices with minimal intrusion to the secure data connection.

Figure 3:
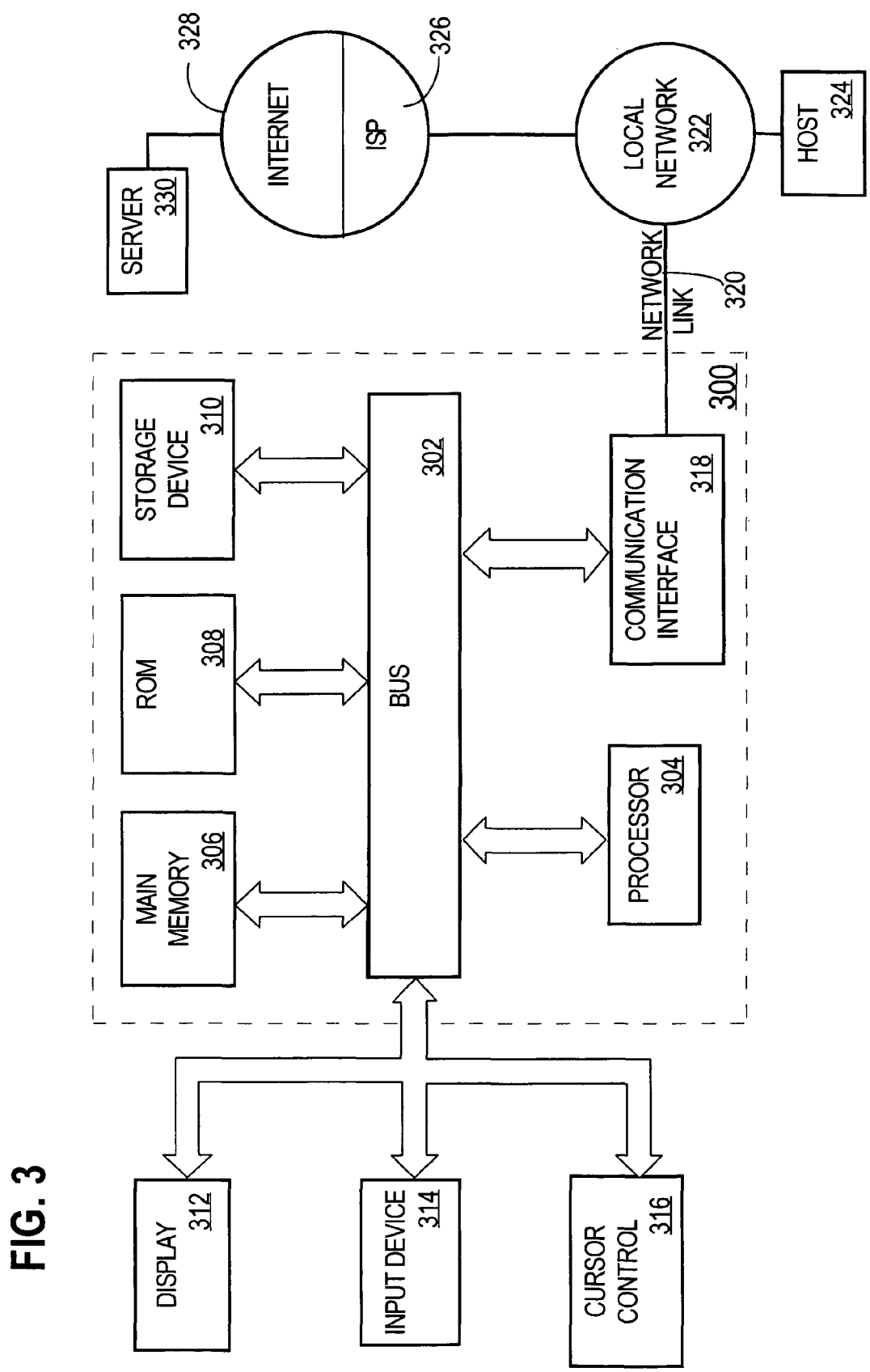
FIG. 3 is a block diagram of a computer system on which embodiments of the invention may be implemented.

The approach described herein may be implemented in hardware, computer software or any combination of hardware and computer software on any type of computing platform. FIG. 3 is a block diagram that illustrates an example computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for deploying a network device, the computer-implemented method comprising:
   establishing a secure introduction network connection between the network device and a registrar;
   the registrar providing bootstrap configuration data to the network device over the secure introduction network connection, wherein the bootstrap configuration data is used to establish a secure management network connection between the network device and a secure management gateway;
   the secure management gateway providing user-specific configuration data and security policy data to the network device over the secure management network connection; and
   establishing a secure data network connection between the network device and a secure data gateway using the user-specific configuration data and the security policy data.

2. The computer-implemented method as recited in claim 1, wherein the secure introduction network connection conforms to the HTTPS communications protocol.

3. The computer-implemented method as recited in claim 1, wherein the secure management network connection conforms to one of an IPsec communications protocol and the HTTPS communications protocol.

4. The computer-implemented method as recited in claim 1, wherein the secure data network connection is a dynamic multipoint VPN (DMVPN) connection.

5. The computer-implemented method as recited in claim 1, wherein the secure management network connection conforms to an IPsec communications protocol and the secure data network connection is a dynamic multipoint VPN (DMVPN) connection.

6. The computer-implemented method as recited in claim 1, further comprising the registrar receiving, from a Web browser executing on the network device, a simple certificate enrollment protocol (SCEP) request that conforms to the HTTPS communications protocol.

7. The computer-implemented method as recited in claim 1, further comprising:
   causing a networking services agent to be instantiated on the network device;
   the secure management gateway receiving, from the networking services agent instantiated on the network device, data that indicates that the secure management network connection has been established; and
   the secure management gateway providing the data to a networking services engine for processing.

8. The computer-implemented method as recited in claim 1, further comprising the secure management gateway providing updated user-specific configuration data and security policy data to the network device over the secure management network connection, wherein the updated user-specific configuration data and security policy data enable the secure management network connection to be updated.

9. The computer-implemented method as recited in claim 1, wherein the network device is a router, the secure management gateway is a management router and the secure data gateway is a corporate router.

10. A computer-readable volatile or non-volatile storage medium for deploying a network device, the computer-readable volatile or non-volatile storage medium storing instructions which, when executed by one or more processors, cause:
   establishing a secure introduction network connection between the network device and a registrar;
   the registrar providing bootstrap configuration data to the network device over the secure introduction network connection, wherein the bootstrap configuration data is used to establish a secure management network connection between the network device and a secure management gateway;
   the secure management gateway providing user-specific configuration data and security policy data to the network device over the secure management network connection; and
   establishing a secure data network connection between the network device and a secure data gateway using the user-specific configuration data and the security policy data.

11. The computer-readable volatile or non-volatile storage medium as recited in claim 10, wherein the secure introduction network connection conforms to the HTTPS communications protocol.

12. The computer-readable volatile or non-volatile storage medium as recited in claim 10, wherein the secure management network connection conforms to one of an IPsec communications protocol and the HTTPS communications protocol.

13. The computer-readable volatile or non-volatile storage medium as recited in claim 10, wherein the secure data network connection is a dynamic multipoint VPN (DMVPN) connection.

14. The computer-readable volatile or non-volatile storage medium as recited in claim 10, wherein the secure management network connection conforms to an IPsec communications protocol and the secure data network connection is a dynamic multipoint VPN (DMVPN) connection.

15. The computer-readable volatile or non-volatile storage medium as recited in claim 10, further storing additional instructions which, when executed by the one or more processors, cause the registrar receiving, from a Web browser executing on the network device, a simple certificate enrollment protocol (SCEP) request that conforms to the HTTPS communications protocol.

16. The computer-readable volatile or non-volatile storage medium as recited in claim 10, further storing additional instructions which, when executed by the one or more processors, cause:
    causing a networking services agent to be instantiated on the network device;
    the secure management gateway receiving, from the networking services agent instantiated on the network device, data that indicates that the secure management network connection has been established; and
    the secure management gateway providing the data to a networking services engine for processing.

17. The computer-readable volatile or non-volatile storage medium as recited in claim 10, further storing additional instructions which, when executed by the one or more processors, cause the secure management gateway providing updated user-specific configuration data and security policy data to the network device over the secure management network connection, wherein the updated user-specific configuration data and security policy data enable the secure management network connection to be updated.

18. The computer-readable volatile or non-volatile storage medium as recited in claim 10, wherein the network device is a router, the secure management gateway is a management router and the secure data gateway is a corporate router.

19. An apparatus for deploying a network device, the apparatus comprising a memory storing instructions which, when executed by one or more processors, cause:
    establishing a secure introduction network connection between the network device and a registrar;
    the registrar providing bootstrap configuration data to the network device over the secure introduction network connection, wherein the bootstrap configuration data is used to establish a secure management network connection between the network device and a secure management gateway;
    the secure management gateway providing user-specific configuration data and security policy data to the network device over the secure management network connection; and
    establishing a secure data network connection between the network device and a secure data gateway using the user-specific configuration data and the security policy data.

20. The apparatus as recited in claim 19, wherein the secure introduction network connection conforms to the HTTPS communications protocol.

21. The apparatus as recited in claim 19, wherein the secure management network connection conforms to one of an IPsec communications protocol and the HTTPS communications protocol.

22. The apparatus as recited in claim 19, wherein the secure data network connection is a dynamic multipoint VPN (DM-VPN) connection.

23. The apparatus as recited in claim 19, wherein the secure management network connection conforms to an IPsec communications protocol and the secure data network connection is a dynamic multipoint VPN (DMVPN) connection.

24. The apparatus as recited in claim 19, wherein the memory further stores additional instructions which, when executed by the one or more processors, cause the registrar receiving, from a Web browser executing on the network device, a simple certificate enrollment protocol (SCEP) request that conforms to the HTTPS communications protocol.

25. The apparatus as recited in claim 19, wherein the memory further stores additional instructions which, when executed by the one or more processors, cause:
    causing a networking services agent to be instantiated on the network device;
    the secure management gateway receiving, from the networking services agent instantiated on the network device, data that indicates that the secure management network connection has been established; and
    the secure management gateway providing the data to a networking services engine for processing.

26. The apparatus as recited in claim 19, wherein the memory further stores additional instructions which, when executed by the one or more processors, cause the secure management gateway providing updated user-specific configuration data and security policy data to the network device over the secure management network connection, wherein the updated user-specific configuration data and security policy data enable the secure management network connection to be updated.

27. The apparatus as recited in claim 19, wherein the network device is a router, the secure management gateway is a management router and the secure data gateway is a corporate router.

28. An apparatus for deploying a network device, the apparatus comprising:
    means for establishing a secure introduction network connection between the network device and a registrar;
    means for the registrar providing bootstrap configuration data to the network device over the secure introduction network connection, wherein the bootstrap configuration data is used to establish a secure management network connection between the network device and a secure management gateway;
    means for the secure management gateway providing user-specific configuration data and security policy data to the network device over the secure management network connection; and
    establishing a secure data network connection between the network device and a secure data gateway using the user-specific configuration data and the security policy data.

29. The apparatus as recited in claim 28, wherein the secure introduction network connection conforms to the HTTPS communications protocol.

30. The apparatus as recited in claim 28, wherein the secure management network connection conforms to one of an IPsec communications protocol and the HTTPS communications protocol.

31. The apparatus as recited in claim 28, wherein the secure data network connection is a dynamic multipoint VPN (DM-VPN) connection.

32. The apparatus as recited in claim 28, wherein the secure management network connection conforms to an IPsec communications protocol and the secure data network connection is a dynamic multipoint VPN (DMVPN) connection.

33. The apparatus as recited in claim 28, further comprising means for causing the registrar receiving, from a Web browser executing on the network device, a simple certificate enrollment protocol (SCEP) request that conforms to the HTTPS communications protocol.

34. The apparatus as recited in claim 28, further comprising means for:

causing a networking services agent to be instantiated on the network device;

the secure management gateway receiving, from the networking services agent instantiated on the network device, data that indicates that the secure management network connection has been established; and the secure management gateway providing the data to a networking services engine for processing.

35. The apparatus as recited in claim 28, further comprising means for causing the secure management gateway providing updated user-specific configuration data and security policy data to the network device over the secure management network connection, wherein the updated user-specific configuration data and security policy data enable the secure management network connection to be updated.

36. The apparatus as recited in claim 28, wherein the network device is a router, the secure management gateway is a management router and the secure data gateway is a corporate router.

* * * * *